(12) United States Patent
Hackl et al.

(10) Patent No.: US 9,211,546 B2
(45) Date of Patent: Dec. 15, 2015

(54) ROTOR DISK

(75) Inventors: Manfred Hackl, Linz-Urfahr (AT);
Klaus Feichtinger, Linz (AT); Gerhard Wendelin, Linz (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 162 days.

(21) Appl. No.: 13/203,709

(22) PCT Filed: Jan. 7, 2011

(86) PCT No.: PCT/AT2011/000005
§ 371 (c)(1),
(2), (4) Date: Oct. 19, 2011

(87) PCT Pub. No.: WO2011/085419
PCT Pub. Date: Jul. 21, 2011

(65) Prior Publication Data
US 2012/0024999 A1 Feb. 2, 2012

(30) Foreign Application Priority Data
Jan. 14, 2010 (AT) .................................. A 42/2010

(51) Int. Cl.
*B02C 18/08* (2006.01)
*B02C 18/18* (2006.01)
(Continued)

(52) U.S. Cl.
CPC ............... *B02C 18/086* (2013.01); *B02C 18/12* (2013.01); *B02C 18/18* (2013.01); *B02C 18/182* (2013.01); *B29B 17/0412* (2013.01); *B29B 2017/048* (2013.01); *Y02W 30/625* (2015.05)

(58) Field of Classification Search
CPC .... B02C 18/182; B02C 18/086; B02C 18/062

USPC ............................ 241/296–298, 261.2, 261.3
See application file for complete search history.

(56) References Cited

U.S. PATENT DOCUMENTS 8,419 A 10/1851 Robbins
20,601 A 6/1858 Wilson
(Continued)

FOREIGN PATENT DOCUMENTS

AT 375867 B 3/1984
AT 407970 B 7/2001
(Continued)

OTHER PUBLICATIONS

International Search Report and Written Opinion mailed on Apr. 15, 2011, for PCT Patent Application No. PCT/AT2011/000003, 9 pages.
(Continued)

*Primary Examiner* — Shelley Self
*Assistant Examiner* — Matthew G Katcoff
(74) *Attorney, Agent, or Firm* — Kilpatrick Townsend & Stockton LLP

(57) ABSTRACT

The invention relates to a rotor disk (1) for inserting into a receiving container (2) for treating polymers, comprising a disk body (3), on the upper face (4) of which mixing and/or comminuting tools (5) can be provided and on the opposite lower face (6) of which a number of conveying ribs (7) extending from the inside out is provided, by means of which conveying ribs polymer particles can be conveyed outward during operation or which conveying ribs exert a force directed outward from the center (8) of the rotor disk (1) on the polymer particles caught by the conveying ribs (7) during operation. According to the invention, the thickness of the disk body (3) is reduced toward the outside.

18 Claims, 5 Drawing Sheets

(51) Int. Cl.
  *B02C 18/12*   (2006.01)
  *B29B 17/04*   (2006.01)

(56) References Cited

U.S. PATENT DOCUMENTS

|  |  |  |  |
|---|---|---|---|
| 27,551 | A | 3/1860 | Littlepage |
| 381,522 | A | 4/1888 | Bachulein |
| 1,556,323 | A | 10/1925 | Garza |
| 1,556,870 | A | 10/1925 | Nelson |
| 1,609,717 | A | 12/1926 | Holland-Letz |
| 2,265,936 | A | 12/1941 | Cowles |
| 2,665,853 | A | 1/1954 | Nicholson, Jr. |
| 2,681,598 | A | 6/1954 | Baxter, Jr. |
| 3,674,217 | A | 7/1972 | Reinhall |
| 4,023,737 | A * | 5/1977 | Leider et al. ............... 241/261.3 |
| 5,509,610 | A * | 4/1996 | Gibbons et al. ................. 241/37 |
| 5,944,271 | A * | 8/1999 | Savujarvi et al. .......... 241/261.3 |
| 6,402,071 | B1 * | 6/2002 | Gingras ..................... 241/261.2 |
| 6,726,622 | B2 | 4/2004 | Spence et al. |
| 7,191,967 | B2 | 3/2007 | Vuorio et al. |
| 7,291,001 | B2 | 11/2007 | Bacher et al. |
| 7,407,123 | B2 | 8/2008 | Antensteiner |
| 2006/0175447 | A1 * | 8/2006 | Duggan .................... 241/261.2 |
| 2007/0205314 | A1 * | 9/2007 | Gingras ..................... 241/261.3 |
| 2008/0296419 | A1 * | 12/2008 | Gingras ........................... 241/28 |
| 2012/0294725 | A1 | 11/2012 | Hackl et al. |
| 2013/0119173 | A1 | 5/2013 | Hackl et al. |

FOREIGN PATENT DOCUMENTS

| AT | 411342 B | 12/2003 |
|---|---|---|
| DE | 707 300 C | 6/1941 |
| DE | 951706 C | 10/1956 |
| DE | 1858029 U | 9/1962 |
| DE | 1 149 978 | 6/1963 |
| DE | 2609850 A1 | 9/1977 |
| DE | 27 24 417 | 12/1977 |
| JP | H0871400 A | 3/1996 |
| JP | H08507478 A | 8/1996 |
| JP | 2001079378 A | 3/2001 |
| JP | 2010535611 A | 11/2010 |
| NL | 72828 C | 2/1953 |
| TW | M342260 U | 10/2008 |
| TW | 200942662 A | 10/2009 |
| WO | 93/18902 A1 | 3/1993 |
| WO | WO 2008/098274 A1 | 8/2008 |

OTHER PUBLICATIONS

International Search Report mailed on May 4, 2011 for PCT Patent Application No. PCT/AT2011/000004, 2 pages.

International Preliminary Report on Patentability mailed on Aug. 7, 2012, for PCT Application No. PCT/AT2011/000003, 25 pages.

Non-Final Office Action mailed Aug. 15, 2014, from U.S. Appl. No. 13/521,580 (11 pages).

Non-Final Office Action mailed Aug. 15, 2014, from U.S. Appl. No. 13/522,267 (12 pages).

Final Office Action mailed Mar. 4, 2015, from U.S. Appl. No. 13/521,580 (17 pages).

Final Office Action mailed Mar. 4, 2015, from U.S. Appl. No. 13/522,267 (16 pages).

* cited by examiner

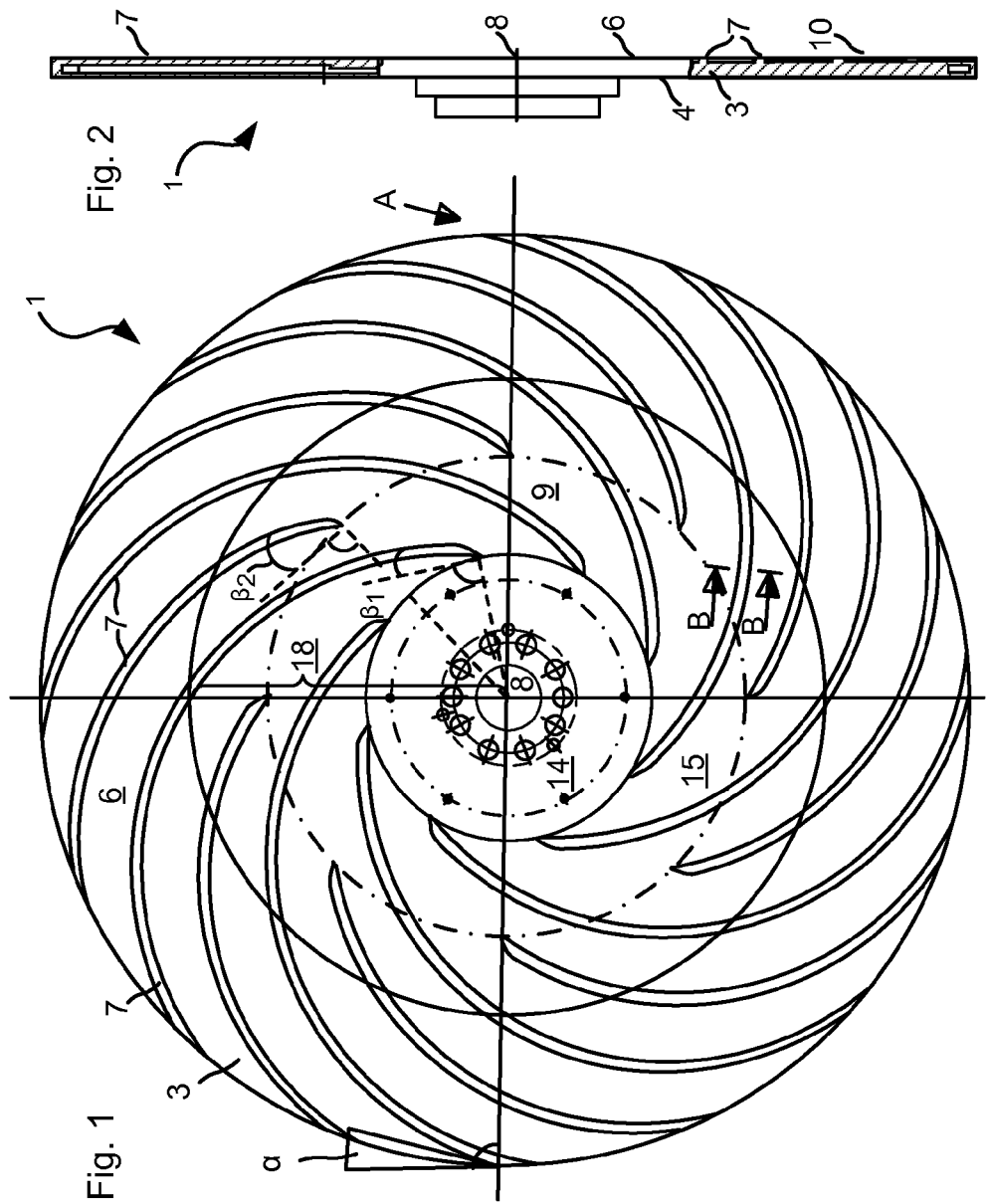

(PARTIAL CROSS SECTION ALONG LINE B-B)

(PARTIAL VIEW A)

ROTOR DISK

CROSS-REFERENCES TO RELATED APPLICATIONS

This application is a National Stage of International Application No. PCT/AT2011/000005 filed Jan. 7, 2011, and which claims the benefit of Austrian Patent Application No. A42/2010, filed Jan. 14, 2010, the disclosures of which are incorporated herein by reference.

BACKGROUND OF THE INVENTION

The invention pertains to a rotor disk according to the generic part of Claim 1.

Several configurations of such rotor disks are known in prior art. They are mostly arranged near the floor of a receiving container or cutter compactor to treat and process thermoplastic polymers and consist substantially of a disk-shaped tool carrier on whose top surface mixing and/or comminuting tools are provided. During operation, the disk turns and the tools grasp and if appropriate comminute the plastic material presented in the container while heating it at the same time. Furthermore, the material is mixed and continuously agitated such that a mixing spout is formed in the container.

In principle, means to process polymers are also known in prior art, for example from AT 375 867 B, AT 407 970 B or WO 93/18902. With the revolving tool carriers or tools, the treated plastic material is hurled against the side wall of the container. Some of this plastic material climbs up along the side wall of the container and revolves in the form of a mixing spout, but eventually it drops back into the center of the container. This results in the desired dwell time of the treated plastic particles in the receiving container, such that the plastic material discharged into it is well mixed, adequately heated through the frictional forces that occur, and—in the case of tools which comminute the plastic material—also adequately comminuted.

However, it has been found that not all the plastic material hurled against the container side wall adheres, but that a portion drops down below the lowest tool, i.e. under the disk that forms the lowest tool carrier. There, that portion of the plastic material can attach itself through friction.

It has been tried to avoid this disadvantage by providing conveying ribs on the lower face of this disk. In that respect, it is known in prior art to provide straight and radial ribs on the lower face of the disk or the tool carrier whose purpose it is to convey plastic material that drops into the section between the floor of the cutter compactor and the lower face of the tool carrier to the outside again and to remove it from that sector.

However, that measure has not been fully satisfactory. In particular with receiving containers of large dimensions and a correspondingly large filling volume of several hundred kilograms of polymer material, sufficiently large disks of large diameters must be used. On the one hand, these disks must have very close tolerances, and they must rotate very quietly and evenly, since the distance between the disk and the floor measures only a few millimeters. In such large-format cutter compactors, there are very high requirements for the conveying performance of the ribs because—as mentioned—there is a large volume of material to be processed which on the one hand must be moved and which on the other hand, due to its own weight, is pushed hard downward and into the section between the disk and the floor.

In upgrading such arrangements it has been shown that the conveying performance of known disks, which still function adequately in smaller containers, is no longer sufficiently able in large containers to keep the material from the critical section. Furthermore, the rpm of the mixing tools that is necessary to provide the material with an upward impetus and to increase dwell time cannot be randomly increased, since the higher friction would again cause greater heat, which could lead to a local melting of the flakes.

Again and again, polymer flakes enter the outer section between the floor and the disk where they remain permanently. This raised the temperature in that section, the flakes agglomerate, become sticky and may even melt, which causes more flakes to stick together. After some time, the disk begins to rattle, and finally it will come to a stop. It is therefore desirable that—should a particle become caught between the ribs and the container floor—this particle should become free again as soon as possible and that it is subsequently removed effectively from the critical sector.

Furthermore, it is not only fairly large flakes, but also quite small dust particles that enter the critical sector below the disk, whereby the dust particles advance much farther in the direction of the disk, where they remain. These fine polymer particles, too, will become too hot, and they will be isolated and captured in the critical sector.

In principle, this is also problematic with disks of smaller diameter, since smaller rpm, i.e. a relatively slow peripheral speed, is used, especially when heavier material is processed.

SUMMARY OF THE INVENTION

It is therefore an object of the present invention to create a rotor disk with which, especially with a large filling volume and at larger dimensions, it is effectively prevented that polymer particles can reach the critical sector between the disk and the floor of the receiving container and/or it is facilitated that they can come free again and can be removed from this sector.

This object can be achieved by the characterizing features of Claim 1, where it is provided that the thickness of the disk body is reduced toward the outside.

In this manner, it is effectively achieved in the treatment and processing of plastic particles that even at a high filling volume and a corresponding high downward pressure, fairly large and coarse polymer flakes which tend to advance only to the edge area of the disk, as well as finer dust particles which can advance very far to the inside, are conveyed to the outside, which keeps the critical section substantially free of such particles.

In particular it is effectively presented in this way that larger particles can become wedged between the floor and the disk, and that the disk is running to a halt. Should particles nevertheless run the risk of remaining longer than expected in the small space between the floor and the bottom part of the disk, they are more easily freed and conveyed to the outside because the thickness of the disk is reduced toward the outside.

This allows for the effective and homogenous processing of the polymer material in the receiving container. Furthermore, periods of downtime and standstill caused by the disk running to a halt are being prevented. The quality of the material to be processed will also be better since local overheating or melting is prevented.

Further advantageous embodiments of the invention are described below by means of the sub claims:

According to one advantageous embodiment of the invention, it is provided that the thickness of the disk body is reduced by at least 1 mm, preferably by between 1.5 to 3.5 mm, whereby the difference in thickness of the disk body is measured between the center or an inner central region and the outer edge. Surprisingly it has been found that even such minor changes can cause a large improvement.

A particularly advantageous embodiment provides that the conveying ribs increase in height toward the outside.

In particular it is advantageous that the thickness of the disk body is reduced toward the outside in the same proportion in which the conveying ribs increase in height toward the outside, or that the overall thickness of the rotor disk remains equal and constant over its radius. This allows for a high degree of quiet running and the effective conveyance of the polymer particles from the critical section.

It is also advantageous if it is provided that the thickness of the disk body remains constant in an interior region and if the thickness is reduced only starting from a distance from the center of the rotor disk, preferably starting from a distance of 60% of the radius, and in particular from a distance of between 60% and 70%. In the same way, it is advantageous when the height of the conveying ribs remains constant in an interior region and is increased only starting from a distance from the center of the rotor disk, preferably from a distance of 60% of the radius, and in particular from a distance of between 60% and 70%. The dimensional changes are only in an outer radial region, namely where the coarser flakes can still barely enter. In this manner, coarse particles as well as fine particles are effectively conveyed to the outside.

According to a preferred embodiment, it is provided that the upper face of the disk body is a level plane and/or that the plane is parallel to the upper face. Such a design is also relatively easy to manufacture and runs very smoothly.

A particularly effective rotor disk is characterized in that the lower face of the disk body in the region, where its thickness is reduced, is beveled and inclined toward the upper face and/or the plane, in particular aligned at an angle of no more than 3°, especially between 0.4° and 0.6°. This results in a disk that has the shape of a quasi truncated cone, whereby it was again surprisingly found that only a slight deviation and a slightly angular direction are sufficient to achieve effective relief.

An embodiment of simple design provides that the reduction in the thickness of the disk body is continuous in one plane, which prevents the formation of swivels and ensures quiet running.

However, a rotor disk is also effective if it is provided that the reduction in thickness of the disk body is discontinuous or in steps, where appropriate in a single step. Whether a continuous or discontinuous reduction is more advantageous depends for example on the type, form and dimensions of the material to be processed, for example on whether film, flakes or granulate are recycled.

In that connection, it was surprisingly found that to allow an even more effective conveying to the outside, it is advantageous if the conveying ribs of the disk are concavely curved, which increases the fan effect even further. That feature supports the effect of the reduced thickness synergistically and surprisingly increases the effect even more. Should a particle still fall through into the critical section, for example when processing is unexpectedly interrupted and the agitator must be stopped, it can be quickly removed again.

It has been shown to be advantageous when the curvatures are equal and circular.

In that connection it is particularly advantageous when the curvatures of all conveying ribs are of equal form. Such a rotor disk is very easy to design.

When it is provided that at least two groups of conveying ribs are provided which begin in alternation at different intervals from the center, namely from an inner central region and from an outer central region, this also facilitates the design because very closely adjacent conveying ribs in the inner section of the disk are avoided.

Surprisingly it has been found advantageous for the conveying effect when the conveying ribs are not radially aligned toward the center, but when the outer end zones of the conveying ribs are almost tangential to the edge of the rotor disk, in particular at an outer angle between 0° and 25°, preferably between 12° and 18°.

It is also advantageous when the inner beginning zones of the conveying ribs are set at inner intersecting angles $\beta_1$ or $\beta_2$ between 0° and 45°, preferably between 15° and 30° to the inner central region and/or the outer central region. It is advantageous when $\beta_2$ is larger than $\beta_1$.

Each intersecting angle is measured at the intersection or point of entry of the conveying rib into the edge of the rotor disk or the inner central region and/or the outer central region. The intersecting angle is always the point between the tangent applied to the conveying rib at this intersection and the tangent applied to the central region and/or outer central region at that intersection.

During operation, the rotor disk turns in the direction of the concave curvature.

In that connection, it is also advantageous when it is provided that the conveying ribs have a substantially triangular cross section with a conveying surface that is straight in running direction and is substantially aligned vertically to the lower face, and a beveled plane flank surface that is inclined downstream in running direction. This ensures that when particles do come under the disk, they can quickly become free and can be conveyed outside again, and that the disk is not running to a halt or slowed down.

To allow that the conveying disk can also affect the temperature of the plastic material to be processed, it is provided in the interest of an advantageous further development that a cavity be formed in the disk body which may be filled or perfused with a coolant where appropriate.

Furthermore, it is intended by the invention that the rotor disk is arranged in a cutter compactor with a short distance to the bottom. An especially advantageous arrangement for the treatment and processing of plastic material provides for a particularly evacuable receiving container whereby the inventive rotor disk is near to and parallel to the floor surface. Advantageously the rotor disk is supported and driven by a substantially vertically aligned shaft such that the plastic material in the receiving container is given a rotational movement around the axis of the shaft.

In a particularly advantageous embodiment, the distance between the rotor disk, namely the outer points or edges of the conveying ribs farthest from the disk and the floor surface of the receiving container, is shorter than the thickness of the disk body, preferably in the range between 3 and 15 mm, preferably between 4 and 8 mm.

Further advantages and embodiments of the invention are explained in the description and the enclosed drawings.

BRIEF DESCRIPTION OF THE DRAWINGS

Below, the invention is shown by the drawings and described by means of a particularly advantageous embodiment with reference to the drawings, where FIG. 1 shows the inventive rotor disk from below;

FIG. 2 shows a sectional view through the center of the disk according to FIG. 1;

DESCRIPTION OF THE PREFERRED EMBODIMENTS

Figure 3:
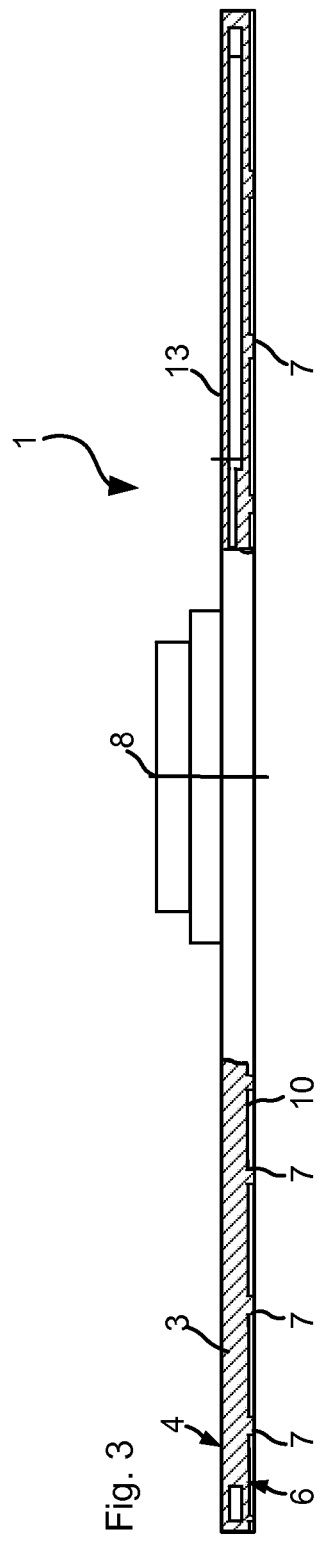
FIG. 3 shows an enlargement of the sectional view according to FIG. 2.

In FIG. 1, a particularly effective and advantageous rotor disk 1 is shown as an example, where FIG. 1 shows the rotor disk 1 from below, i.e. in operation, seen from the container floor 17. In practice, such rotor disks 1 are employed in usually large-volume receiving containers 2 which contain large volumes of polymer material with a correspondingly heavy weight. For that reason, much pressure is exerted on rotor disk 1. In such cases, the diameter of such a rotor disk 1 is in the range of about 2 m or more.

Rotor disk 1 has a disk body 3 on the upper face 4 of which mixing and/or comminuting tools 5 can be provided. On the opposite lower face 6 of disk body 3, a number of conveying ribs 7 is provided which extend from the inside to the outside. All conveying ribs 7 are concavely curved in the running direction of disk 1, whereby the curvatures are of equal circular form. The curvature radius of the conveying ribs 7 is smaller than the radius of disk 1, namely about 65% thereof. Furthermore, the curvatures of all conveying ribs are almost equal.

Two groups of conveying ribs are provided, namely longer and shorter ribs, which are arranged in alternation. The longer conveying ribs 7 begin in an inner circular central region 14 whose radius is about 30% of the radius of rotor disk 1. The shorter conveying ribs 7 begin in an outer central region 15 whose radius is about 50% of the radius of rotor disk 1. All conveying ribs 7 run continuously to the outer edge of rotor disk 1 of disk body 3.

The conveying ribs are not aligned radially toward the center 8 of rotor disk 1.

Thus, the outer end zones of all conveying ribs 7 are almost tangential to the outer edge of the rotor disk, namely at an outer intersecting angle α of about 14°, measured at the entry point of conveying rib 7 to the edge or periphery, between the tangent applied to the outer edge and the tangent applied to conveying rib 7, whereby conveying rib 7 contacts the outer edge or periphery.

The inner beginning zones of the longer conveying ribs 7 are set at a first inner intersecting angle $\beta_1$ of about 15° to the inner central region 14, always measured at the entry point of conveying rib 7, between the tangent applied to the inner central region 14 and the tangent applied to conveying rib 7, whereby it or conveying rib 7 contacts the inner central region 14.

The inner beginning zones of the shorter conveying ribs 7 are set at a second inner intersecting angle $\beta_2$ of about 35°-40° to the outer central region 15, always measured at the entry point of conveying rib 7, between the tangent applied to the outer central region 15 and the tangent applied to conveying rib 7, whereby it or conveying rib 7 contacts the outer central region 15.

It is advantageous when $\beta_2$ is greater than $\beta_1$.

In the contact region to the inner central region 14 and the outer central region 15, the conveying ribs 7 have pointed endings.

With such a design of conveying ribs 7, large as well as small polymer particles can be conveyed to the outside during operation, and a force directed outwardly from the center 8 of rotor disk 1¹ is exerted upon the particles grasped by conveyor ribs 7. As a rule, the conveying effect on the polymer particles is achieved by the mechanical action of conveying ribs 7, since the treatment is usually in a vacuum. However, in the same way, treatment is also possible under ambient pressure, whereby in addition to the mechanical contacts there are also flow effects between conveying ribs 7 and the polymer particles.

Figure 4:
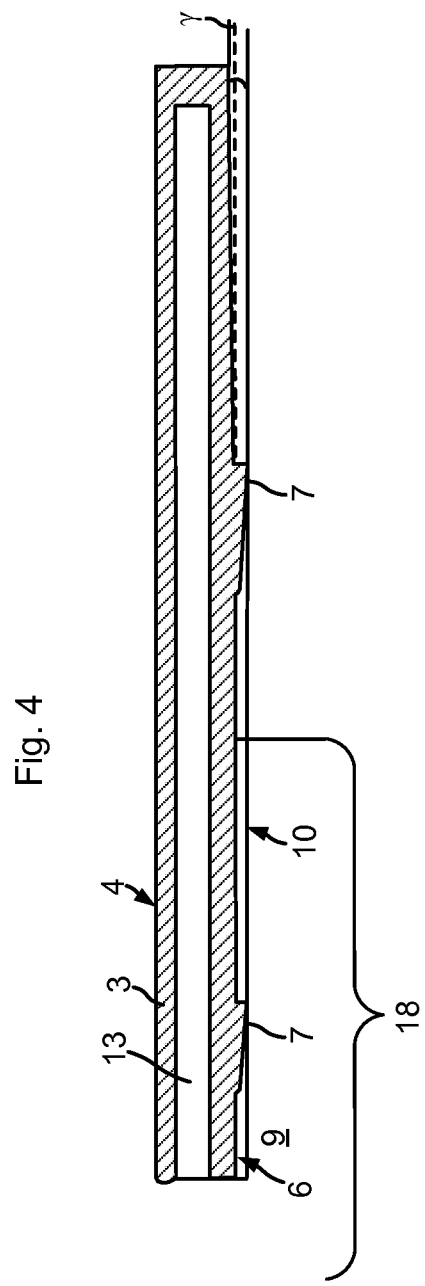
FIG. 4 shows a detail from the right-hand side of the sectional view according to FIGS. 2 and 3.

In FIGS. 2, 3 and 4, the rotor disk 1 is shown in sectional view through center 8. On the upper face 4 of disk body 3, which in operation is facing the container, mixing and/or comminuting tools 5 can be provided. The present embodiment does not show such tools. The mixing and/or comminuting tools 5 can be scoops, knives or such. They grasp the polymer particles and bring them to a rotating movement, resulting in the formation of a mixing spout in the container. Furthermore, the particles are heated and kept in constant mixing condition, so that they will not stick together even at higher temperatures. Larger format granulates can also be shredded or comminuted.

On the lower face of disk body 3, the conveying ribs 7 are provided. The thickness of disk body 3 is constant and uniform in an inner section 9. This inner section 9 extends over about two-thirds of the radius of rotor disk 1. Starting from a certain distance 18 from the center 8 of rotor disk 1, the thickness of the disk body 3 is reduced. In the present example, the radial distance 18 is about 68% of the radius of rotor disk 1. Also from this radial distance, the height of the conveying ribs 7 quickly increases outwardly in proportion, while the height of the conveying ribs 7 in the inner section 9 remains constant and uniform.

It can be seen from FIGS. 2 to 4 that the thickness of disk body 3 is only slightly reduced, namely in the present embodiment by only 2 mm. In the same manner, and to the same extent, the height of the conveying ribs 7 is increased toward the outside, such that the overall thickness of rotor disk 1 is equal and constant over its entire radius. In that outer region, only the distance between the disk body 3 or the lower face 6 and the upper points of conveying ribs 7 becomes larger, or the area between the conveying ribs 7 becomes somewhat higher.

The points or areas of conveying ribs 7 which are the farthest from the upper face 4 form a level plane 10 which is aligned parallel to the upper face 4 of disk body 3.

In the present example, the reduction thickness of disk body 3 runs continuously or over a suitable plane. The lower face 6 of disk body 3 is beveled in the outer region where its thickness is reduced and inclined toward the upper face 4 at an angle γ of about 0.5%. Thus, the rotor disk 1 or disk body 3 quasi had the form of a truncated cone with a flattened outer peripheral edge.

According to another possible embodiment, the thickness of the disk body 3 can also be reduced discontinuously or in steps, which would bring advantages in the case of certain recycled materials.

It is furthermore provided that a cavity 13 is formed inside the disk body 3, which can at least be perfused by a coolant which can cool the disk.

Figure 5:
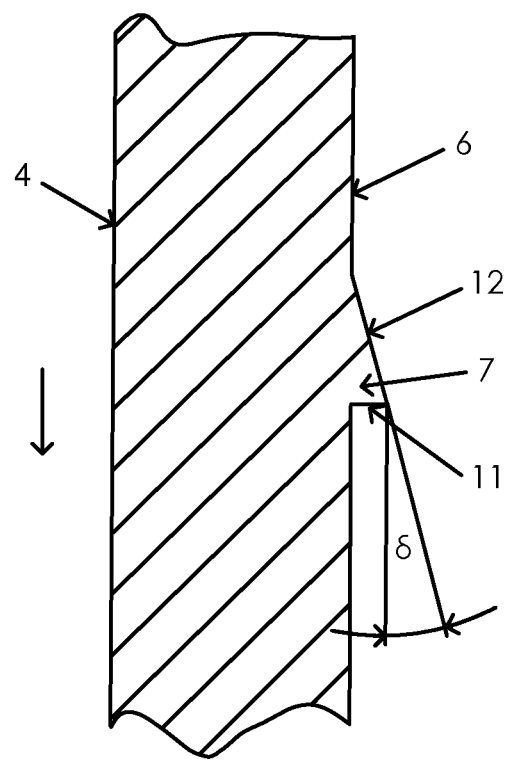
FIG. 5 shows the partial section B-B in FIG. 1.

FIG. 5 shows a cross section through a conveying rib 7. Each conveying rib 7 is provided with a substantially triangular cross section with a conveying surface 11 substantially aligned vertically to lower face 6, and an inclined flank surface 12 downstream to the running direction at an angle δ between 10° and 35°, in particular about 15°.

Figure 6:
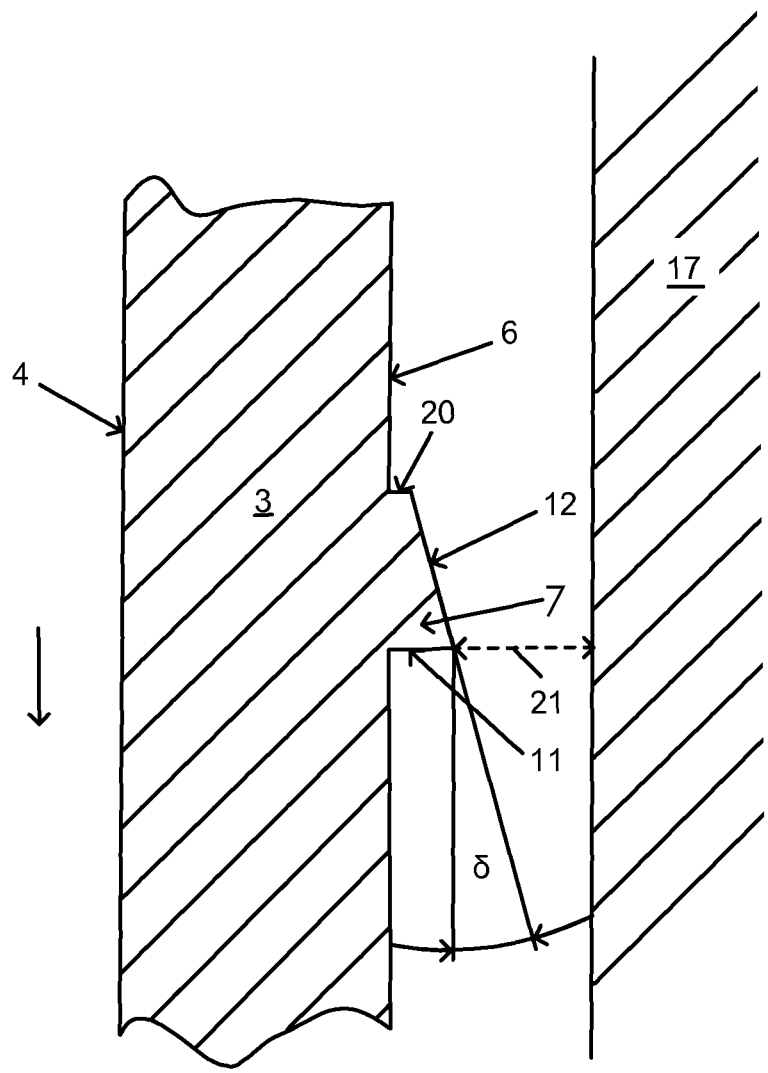
FIG. 6 shows the partial view of A according to FIG. 1.

FIG. 6 is a view of a conveying rib 7, shown diagonally from the side of rotor disk 1. It can be recognized that the flank surface 12 does not continuously, directly or at an acute angle turn into the lower face 6, but via an edge or step 20. However, the transition can also be without a step 20.

Figure 7:
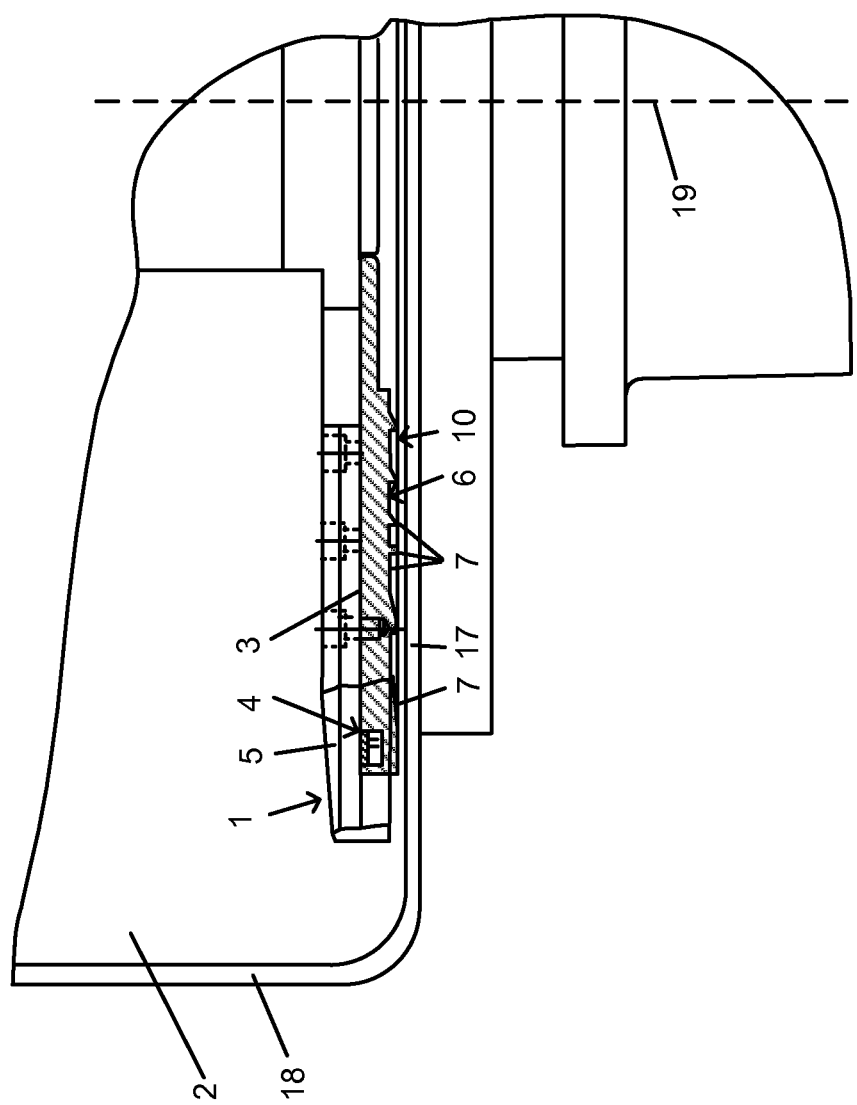
FIG. 7 shows an excerpt of a receiving container with a disk arranged therein.

FIG. 7 shows an inventive rotor disk 1 in operation, namely employed in an arrangement to treat and process plastic material. FIG. 7 shows the left bottom portion of such an arrangement. Rotor disk 1 is installed in an evacuable receiving container 2 which is provided with a completely plane horizontal floor surface 17 and with vertical side walls 18. Rotor disk 1 is arranged close to the floor and parallel to floor surface 17 and is carried by a substantially vertically aligned shaft 19, and it can also be driven by this shaft 19. The material in the receiving container 2 is moved through the rotation of rotor disk 1, in particular through mixing tools 5, and it is moved about the axis of shaft 19.

The distance 21 between the rotor disk 1, namely the outermost points or rims or edges of conveying ribs 7 of plane 10, and the floor surface 17 is relatively small and lies in the range between about 5 to 6 mm. FIG. 6 shows schematically and not to scale the distance 21 between the floor surface 17 and rotor disk 1. At a diameter of about 2000 mm, the disk rotates at about 10 to 300 rpm, e.g. 20 to 150 rpm.

A particularly advantageous embodiment of an arrangement has an evacuable receiving container 2 of circular cross section and with a vertical axis, in which the plastic material to be processed, in particular thermoplastic material such as PET (polyethylene terephthalate) in the form of stock consisting of bottles or bottle molds, film, flakes, etc., is loaded from the top through an input opening. To be connected to this opening, when the material must be processed in a vacuum, is a lock whose lock chamber can be closed with two slides that can be moved back and forth by double-action cylinders. The lock is connected at the top to a loading funnel in which the material is loaded in batches or continuously by means of a supply means such as a belt conveyor. The lock chamber is connected to an evacuation line which leads to an evacuation means. Another evacuation line leads from the receiving container 2 to the evacuation means.

The receiving container 2 has vertical side walls 18 and a horizontal floor 17. Provided near floor 17 is a tool carrier formed by a horizontal circular rotor disk 1 which sits on a shaft 19 penetrating floor 17 in vacuum-tight fashion, which shaft 19 is driven by a motor in the direction of the arrow. On upper face 4 of rotor disk 1, distributed at equal intervals around its circumference, are several tools 5, which act upon the plastic material in container 2 when disk 1 rotates. On the one hand, this drives the plastic material to rotate about axis 19, on the other hand, the centrifugal force tries to move the plastic material in a radial direction toward side wall 18. This results in a mixing spout such that a portion of the plastic material creeps up along side wall 18, reaches a culmination point during this rotation and then drops back into the area of the container axis. However, not all the plastic material is creeping up in this fashion because some of the plastic material spun off from disk 1 enters the critical space below disk 1, especially when there is much material in the container.

In the present case, to reduce this effect, disk 1 carries several inclined scoops around the circumference of the disk arranged at regular intervals. These scoops provide the plastic material spun off disk 1 by tools 5 with a preferred upward movement and prevent to some extent that parts of the plastic material can enter the space under disk 1 of the tool carrier.

However, this effect is only optimized when the inventive conveying ribs 7 are provided on the lower face 6 of disk 1, which are arranged such that plastic material entering or pushing into the critical sector is conveyed in the direction of side wall 18. The plastic material is caught by the scoops and conveyed upward again.

The invention claimed is:

1. A rotor disk for installation in a receiving container for the treatment of polymers, comprising:
   a disc body configured to provide on an upper face of the disc body at least one era mixing or a comminuting tool and configured to provide on a lower face of the disc body a number of conveying ribs which extend from a center of the disc body toward a circumference of the disc body,
   wherein said conveying ribs are concavely curved in a rotational or a running direction, further wherein said conveying ribs are configured to at least one of convey polymer particles toward a circumference of the disc body during operation or exert a force directed outward from the center of the rotor disk on the polymer particles caught by the conveying ribs during operation,
   wherein the thickness of the disk body in an inner section is constant, and starting from a distance from the center of the rotor disk of 60% to 70% of the radius of the disk body is reduced towards the circumference of the disk body, and further wherein the disk body decreases in thickness toward the circumference of the disc body in the same proportion as the conveying ribs increase in height toward the circumference of the disc body such that the overall thickness of the rotor disk is equal and constant over the radius of the disc body.

2. The rotor disk according to claim 1, wherein the thickness of the disk body is reduced by at least 1 mm.

3. The rotor disk according to claim 1, wherein the height of the conveying ribs remains constant in an interior region and is increased starting from a distance from the center of the rotor disk of 60% to 70% of the radius.

4. The rotor disk according to claim 1, wherein points or sections of the conveying ribs farthest away from the upper face define or span a level plane.

5. The rotor disk according to claim 1, wherein the upper face of the disk body is a level plane or is parallel to a level plane.

6. The rotor disk according to claim 5, wherein the lower face of the disk body in the area where the thickness of the disk body is reduced is beveled and inclined toward at least one of the upper face and the level plane at an angle γ of no more than 3°.

7. The rotor disk according to claim 1, wherein the reduction in thickness of the disk body is continuous.

8. The rotor disk according to claim 1, wherein the reduction in thickness of the disk body is either discontinuous, in steps, or in a single step.

9. The rotor disk according to claim 1, wherein the curvatures of all conveying ribs are either equal or have an equal circular form.

10. The rotor disk according to claim 1, wherein at least two groups of conveying ribs are provided which begin in alternation at different distances from the center, wherein one of the two groups of conveying ribs begin from an inner central region and wherein one of the two groups of conveying ribs begin from an outer central region.

11. The rotor disk according to claim 10, wherein outer end zones of the conveying ribs are aligned tangentially to an edge of the rotor disk at outer intersecting angles α between 0° and 25°, wherein inner beginning zones of the conveying ribs are set to the inner central region or the outer central region at a first intersecting angle $β_1$ between 0° and 45° and a second intersecting angle $β_2$ between 0° and 45°, whereby the second inner intersecting angles $β_2$ are larger than the first intersection angles $β_1$, whereby the intersecting angles are always measured between the tangents applied to the conveying ribs and the tangents applied to the edge of rotor disk or the inner central region or the outer central region, in an intersecting point of these tangents or entry points of the conveying ribs.

12. The rotor disk according to claim 1, wherein the conveying ribs have a cross section that is triangular, with a conveying surface that is straight in running direction and is aligned vertically to the lower face, and a beveled plane flank surface that is inclined downstream in running direction, whereby the flank surface is aligned at an angle $\delta$ between 10° and 35° from the lower face.

13. The rotor disk according to claim 1, wherein a cavity is formed in the disk body which is configured to be filled or perfused with a coolant.

14. The rotor disk according to claim 6, wherein the lower face of the disk body in the area where its thickness is reduced is beveled and inclined toward at least one of the upper face and the level plane at an angle $\gamma$ in between 0.4° and 0.6°.

15. The rotor disk according to claim 11, wherein the outer end zones of the conveying ribs are aligned tangentially to the edge of the rotor disk at outer intersecting angles $\alpha$ between 12° and 18°.

16. The rotor disk according to claim 11, wherein the inner beginning zones of the conveying ribs are set to the inner central region or the outer central region at the first and second intersecting angles $\beta_1$ or $\beta_2$, each of $\beta_1$ or $\beta_2$ being between 15° and 30°.

17. The rotor disk according to claim 2, wherein the thickness of the disk body is reduced by at least 1.5 mm to 3.5 mm.

18. The rotor disk according to claim 12, wherein the flank surface is aligned at an angle $\delta$ of 15° from the lower face.

* * * * *